(No Model.) 2 Sheets—Sheet 1.
R. MORRELL.
SAW SWAGE.
No. 541,942. Patented July 2, 1895.
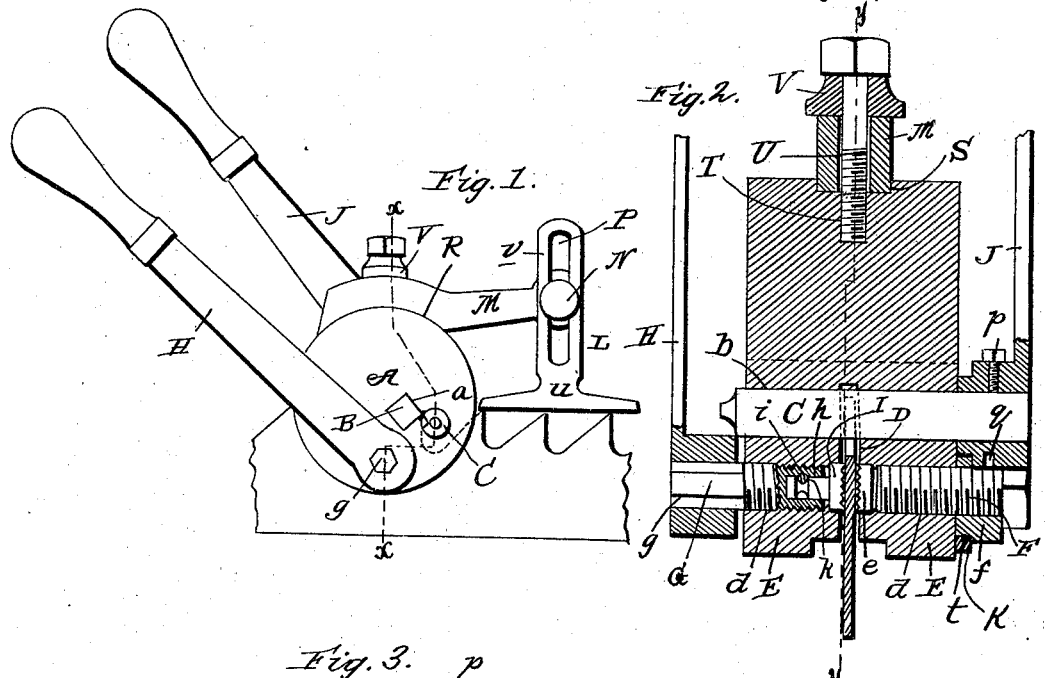
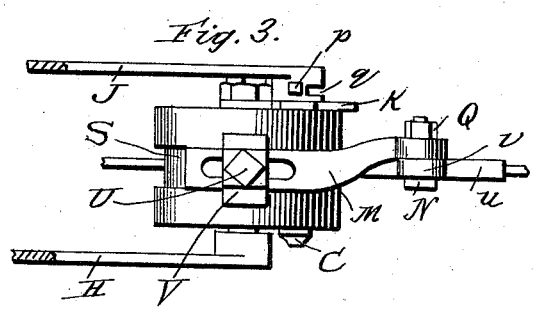
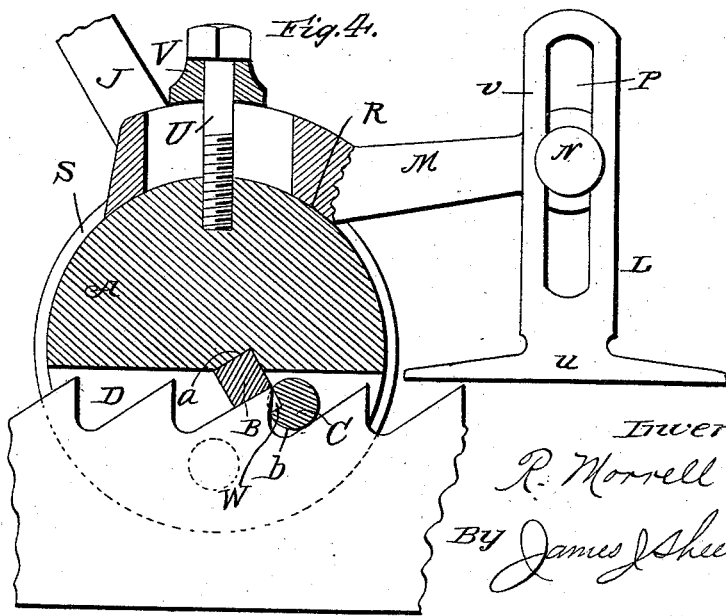
Witnesses:
C. H. Raeder
John J. Sheehy
Inventor
R. Morrell
By James J. Sheehy
Attorney (No Model.) 2 Sheets—Sheet 2.

R. MORRELL.
SAW SWAGE.

No. 541,942. Patented July 2, 1895.

Witnesses:
Inventor
R. Morrell
BY James J. Sheehy
Attorney

UNITED STATES PATENT OFFICE.

RUDOLPH MORRELL, OF WINONA, MINNESOTA.

SAW-SWAGE.

SPECIFICATION forming part of Letters Patent No. 541,942, dated July 2, 1895.

Application filed March 8, 1895. Serial No. 540,958. (No model.)

*To all whom it may concern:*

Be it known that I, RUDOLPH MORRELL, a citizen of the United States, residing at Winona, in the county of Winona and State of Minnesota, have invented certain new and useful Improvements in Saw-Swages; and I do declare the following to be a full, clear, and exact description of the invention, such as will enable others skilled in the art to which it appertains to make and use the same.

This invention relates to improvements in saw swages, and the many objects and advantages will appear from the following description and claims when taken in connection with the annexed drawings, in which—

Figure 5:
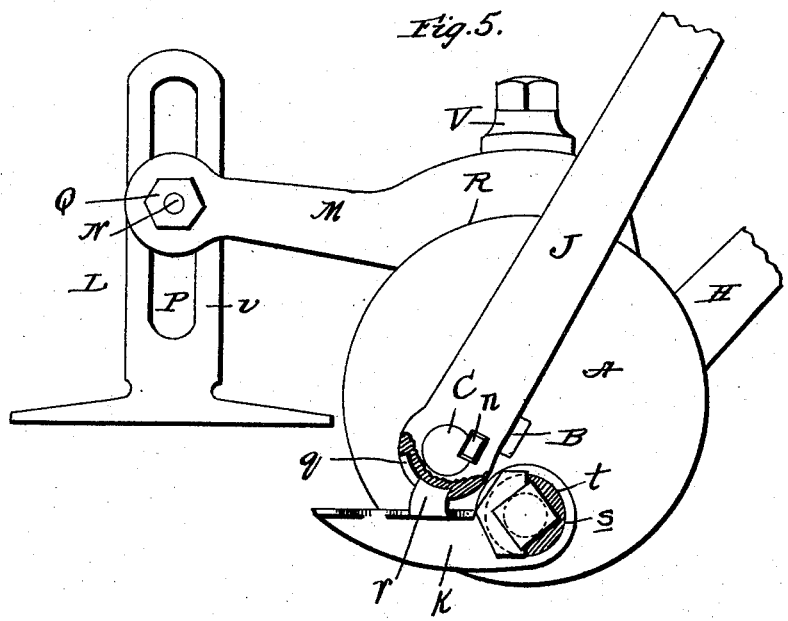
Figure 6:
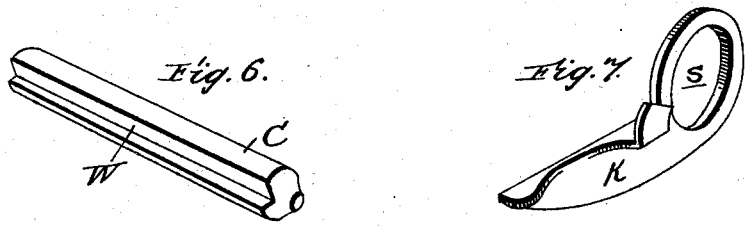
Figure 7:
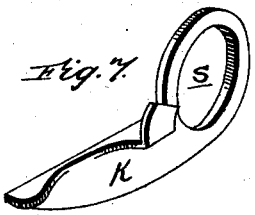
Figure 8:
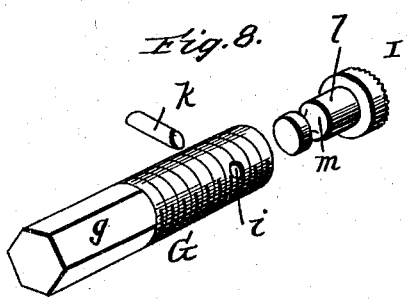

Figure 1 is a side elevation of my improved device, showing the same applied to a part of a saw. Fig. 2 is an enlarged vertical sectional view, taken in the plane indicated by the dotted line $x\ x$ on Fig. 1, with the handles of the levers broken away. Fig. 3 is a plan view of the device. Fig. 4 is a vertical section taken at right angles to Fig. 2 and in the plane indicated by the dotted line $y\ y$ thereon. Fig. 5 is an enlarged elevation, with parts in section and parts broken away, looking from the side opposite to that shown in Fig. 1. Fig. 6 is a perspective view of the swaging die removed. Fig. 7 is a perspective view of the stop for limiting the movements of the swaging lever, and Fig. 8 is a perspective view of one of the adjusting screws for securing the saw in the stock or head with the parts dissembled.

Referring by letter to said drawings, A, indicates the stock or head which may be formed of steel or other suitable material and is shown as of a circular form in outline, although it is obvious that the configuration may be changed according to the fancy or dictation of the mechanic. This head is provided transversely at or near its center with an angular aperture $a$, to receive an anvil B, which is of a rectangular form in cross section, although it may be provided with more or less flat sides or faces, if found desirable. The head is also provided transversely with a circular hole or aperture $b$, which opens into the angular aperture $a$, as shown, and is designed to receive the swaging die C, as will be hereinafter more fully described. The head is slotted centrally and vertically from its under side for about one half of its altitude as shown at D, to receive the saw to be operated upon, and the machine is designed for operating upon either a straight or circular saw with equal ease and facility. The head is provided in each slotted branch E, with a transversely disposed screw tapped aperture $d$, to receive set screws or bolts to engage a saw blade when placed in the slot D.

F indicates a threaded bolt or screw which takes into the threaded aperture $d$, of one of the branches E, and is provided on its inner end with a milled or roughened head $e$, so as to impinge against one side of the saw blade and prevent any slipping thereon; a jam-nut $f$, being employed on this threaded and headed bolt for securing the same.

G indicates a set bolt or screw which is of a peculiar construction and takes into the threaded aperture $d$, of the opposite branch E. This set screw or bolt, as better shown in Fig. 8, of the drawings, is of a polygonal or angular form in cross section at its outer end $g$, to receive a lever H, and is threaded externally for a portion of its length to engage the threads in the aperture $d$. This screw is recessed centrally in its inner end for a sufficient distance as shown at $h$, and crossing this aperture is a hole $i$, to receive a pin $k$.

I indicates a head which is milled or roughened at one end and its opposite end is reduced as shown at $l$, and is provided with an angular or circumferential groove $m$. The reduced portion of the head is designed to be placed in the recess or aperture $h$, and pin $k$, is designed to enter the groove $m$, so as to allow the head to swivel but yet prevent it from falling out.

By this construction it will be seen that the device can be quickly applied to and removed from the saw without disconnecting any of the parts, and the construction will permit of easy adjustment to saws of various characters. The flat sided or angular anvil may be also readily removed and replaced in the head so that when one side becomes impaired or injured, it can be removed and turned so as to present another side to the swaging die.

J indicates the swaging lever. This lever is detachably secured to one end of the swaging die C, by means of a key n, which enters the groove W, of said die, and a set screw or bolt p, may also be employed for holding the lever to the die as better shown in Fig. 2, of the drawings. This lever is provided at its lower end with a slot q, to receive a lug or arm r, which is designed to serve as a stop and limit the movement of said lever. This lug is secured to or formed on a plate or arm K, which has an eye s, at one end and is received by a groove t, on the jam-nut f, although it obvious that this stop device might be secured to the head by any suitable means.

In addition to serving as a stop for limiting the swinging movement of the lever J, the lug r, of the arm K, serves to prevent lateral movement of the lever J, and endwise movement of the die C, with respect to the head A.

L indicates a gage. This gage is designed to adjust the device to saws of different kinds and comprises a plate or casting having a face u, to bear upon the teeth of the saw and a slotted branch v, rising from said face. This gage is held to the head adjustably by means of an arm M, which is provided at its outer end with an eye to receive a bolt or screw N, which takes through the slot P, of the branch v, of the gage, and a nut Q, may be employed for securing the slotted branch of the gage to said arm, as shown. The inner or opposite end of this arm is beveled or rounded on its under side as shown at R, and bears in a groove S, formed centrally on the upper side of the head, A, and in which is a screw tapped aperture T. The arm is also slotted at its inner end and through this slot is passed a bolt U, which also takes into the screw tapped aperture T, of the head, and a bearing nut V, is placed on the bolt beneath the head thereof so as to straddle the slot in the arm and fix the position of the same with respect to the head. By this construction it will be seen that the arm is adjustably connected to the head, and the gage is in turn adjustably connected to the arm so that there will be both an angular and a vertical adjustment afforded the gage upon the saw.

In operation, after a saw has been adjustably secured as before described, and it is desired to swage the teeth all uniformly, it is simply necessary for the operator to grasp the lever J, so as to turn the swaging die against the tooth and anvil backing the tooth, when the tooth will be quickly swaged and each and every tooth will be swaged alike. When the operator reverses the movement of the lever, he turns the swaging die so as to bring the longitudinal V-shaped groove W, thereof, in a position to admit the tooth between the die and anvil, and as both walls of this groove are similar, when one becomes worn or injured, it is simply necessary to remove the die, turn it, and then replace it, when the opposite wall of the die can be used.

As will be readily observed the groove W, of the die C, is much longer than the width of a saw blade, and it will therefore, be appreciated that when a portion of one wall of said groove is worn, the die C, may be moved in the direction of its length and may be adjustably fixed through the medium of the lever J, and stop r, on the arm K, so as to present a new surface to a saw tooth. By reason of this, almost the entire length of both walls of the groove W, in die C, must be worn before the die is rendered useless.

The anvil B of my improved swage is also adjustable in the direction of the width of the head A, so as to permit of a new or unused portion of the same being brought into operation. Said anvil will therefore last much longer.

Having described my invention, what I claim is—

1. In a saw swage, the combination of a head adapted to receive a saw blade, an anvil arranged transversely in the head, the endwise adjustable rotary swaging die arranged transversely in the head and having the longitudinal groove W, a hand lever arranged on the die, a key arranged in a recess of the hand lever and the groove W, of the die, a set screw taking through said lever and engaging the die, and means for preventing lateral movement of the hand lever and consequently endwise movement of the die with respect to the head, substantially as specified.

2. In a saw swage, the combination of the head slotted in its under side to receive a saw blade and grooved in its upper side, the slotted gage L, the arm M, adjustably connected with the gage L, by a bolt taking through the slot thereof and having the curved and slotted portion conforming to the curvature of the head and arranged in the groove thereof, and the headed bolt taking through the slot of the arm M, and into the head, substantially as specified.

3. A saw swage comprising the head adapted to receive a saw blade and grooved in its upper side, the slotted gage L, the arm M, adjustably connected with the gage L, by a bolt taking through the slot thereof and having the curved and slotted portion conforming to the curvature of the head and arranged in the groove thereof, the headed bolt taking through the slot of the arm M, and into the head, the anvil arranged transversely in the head, the die also arranged transversely in the head a bolt arranged transversely in the head and adapted to engage one side of a saw blade and a threaded bolt arranged transversely in the head and adapted to engage the opposite side of a saw blade and having its outer end of angular form in cross section, a lever mounted on said bolt, a lever adapted to turn the die, and means for adjustably holding said lever against lateral movement and the die against endwise movement, substantially as specified.

4. In a saw swage, the combination of a head adapted to receive a saw blade, of the anvil placed in said head, the swaging die, the handle secured to one end of said die, and provided with a slot $q$, the stop adapted to enter said slot in the lever, and a suitable means for securing the stop to the head, substantially as specified.

In testimony whereof I affix my signature in presence of two witnesses.

RUDOLPH MORRELL.

Witnesses:
JOHN B. GEBHART,
W. A. FINKELNBURG.